Sept. 3, 1963 M. R. PARKE ETAL 3,102,324
INSULATED WIRE HEAD
Filed April 17, 1961 6 Sheets-Sheet 2
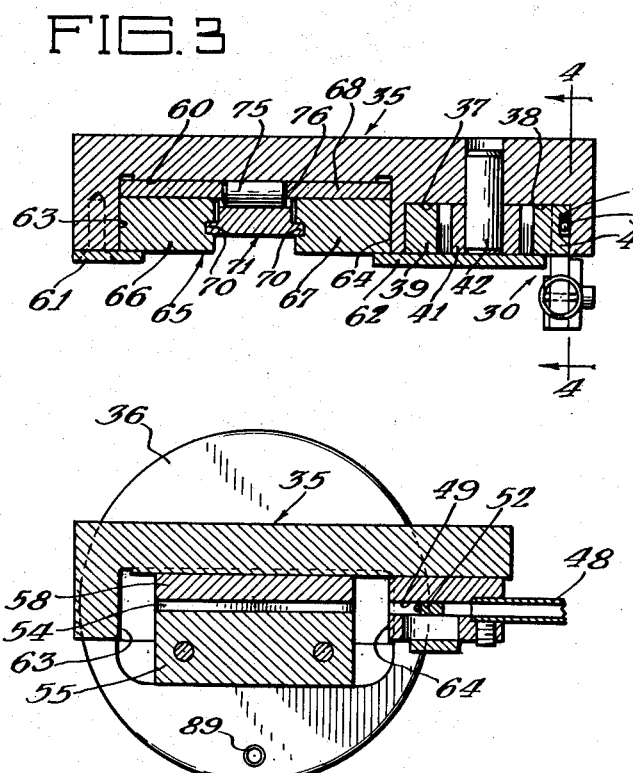
FIG.3
FIG.6
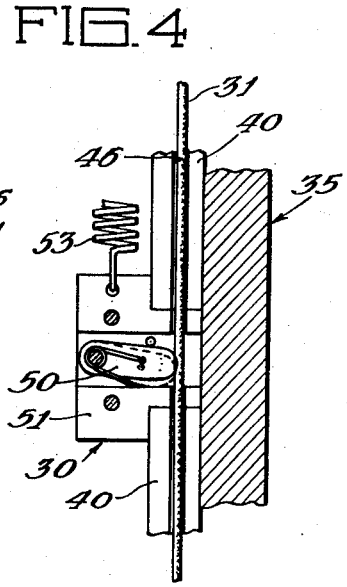
FIG.4
FIG.5
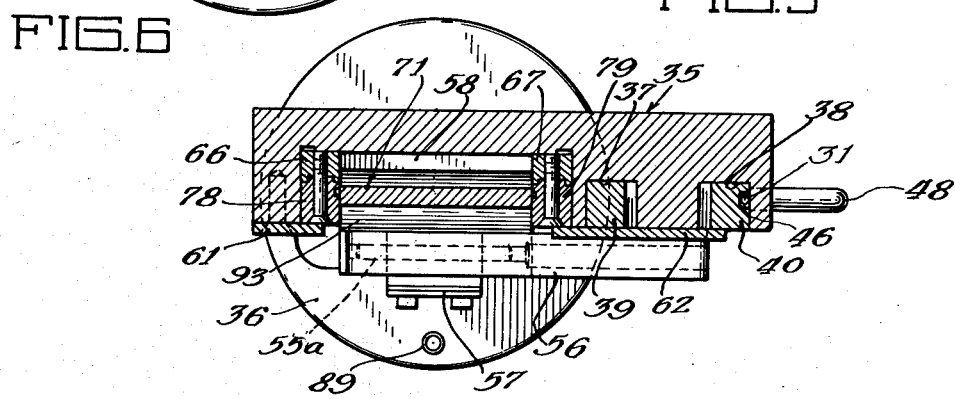
FIG.7
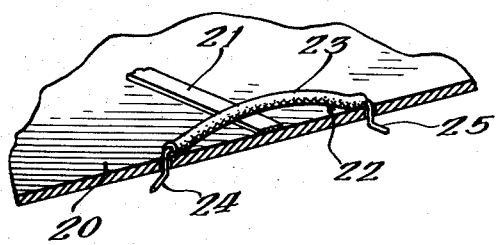

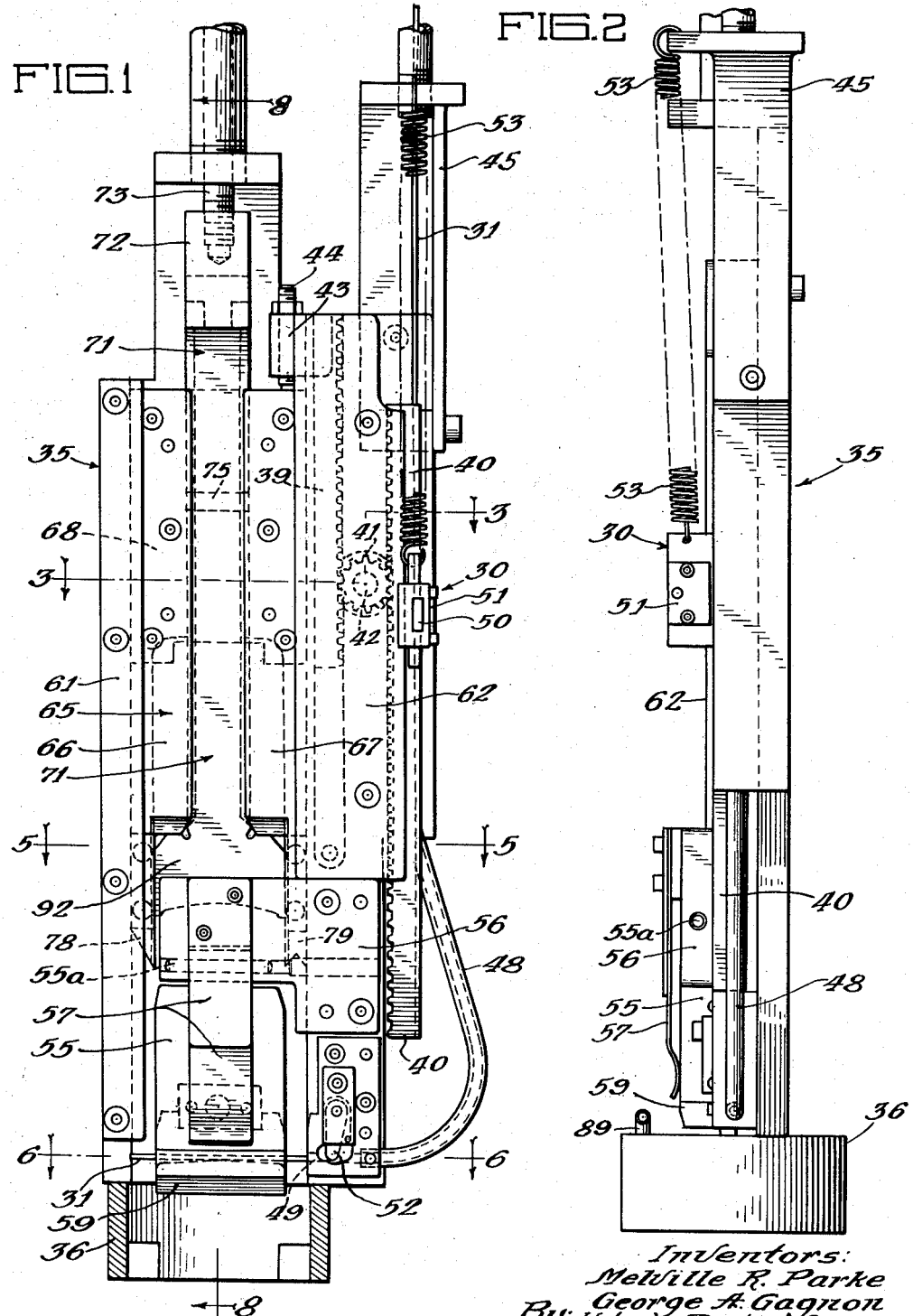

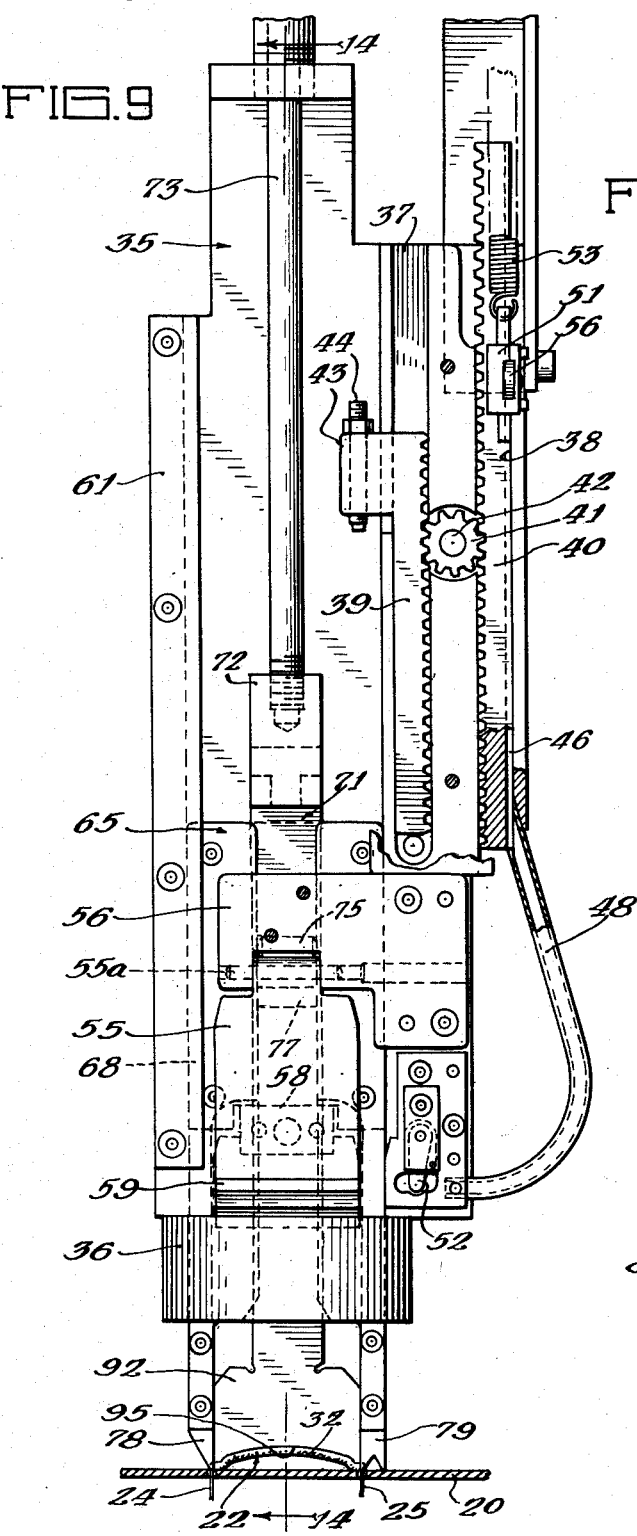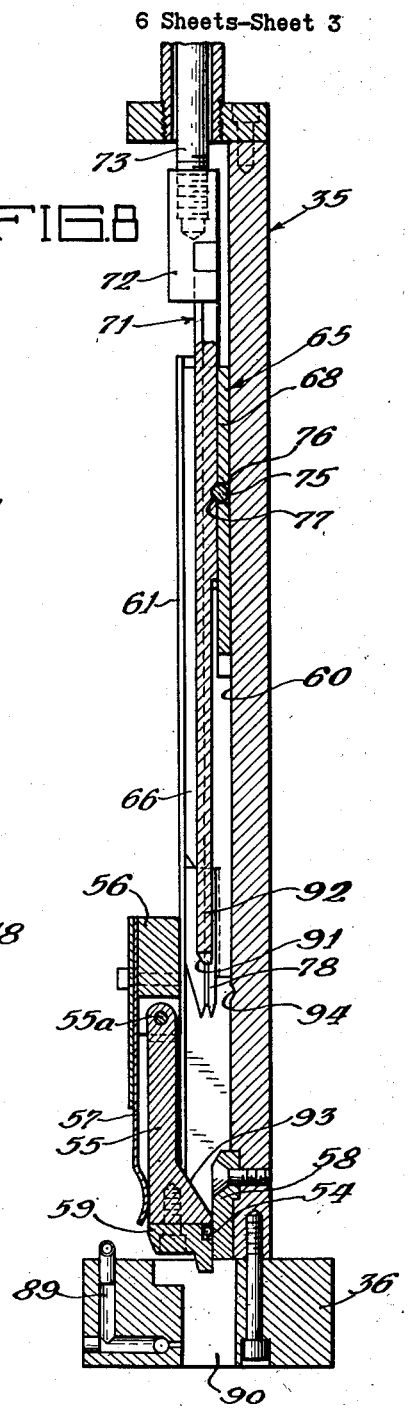

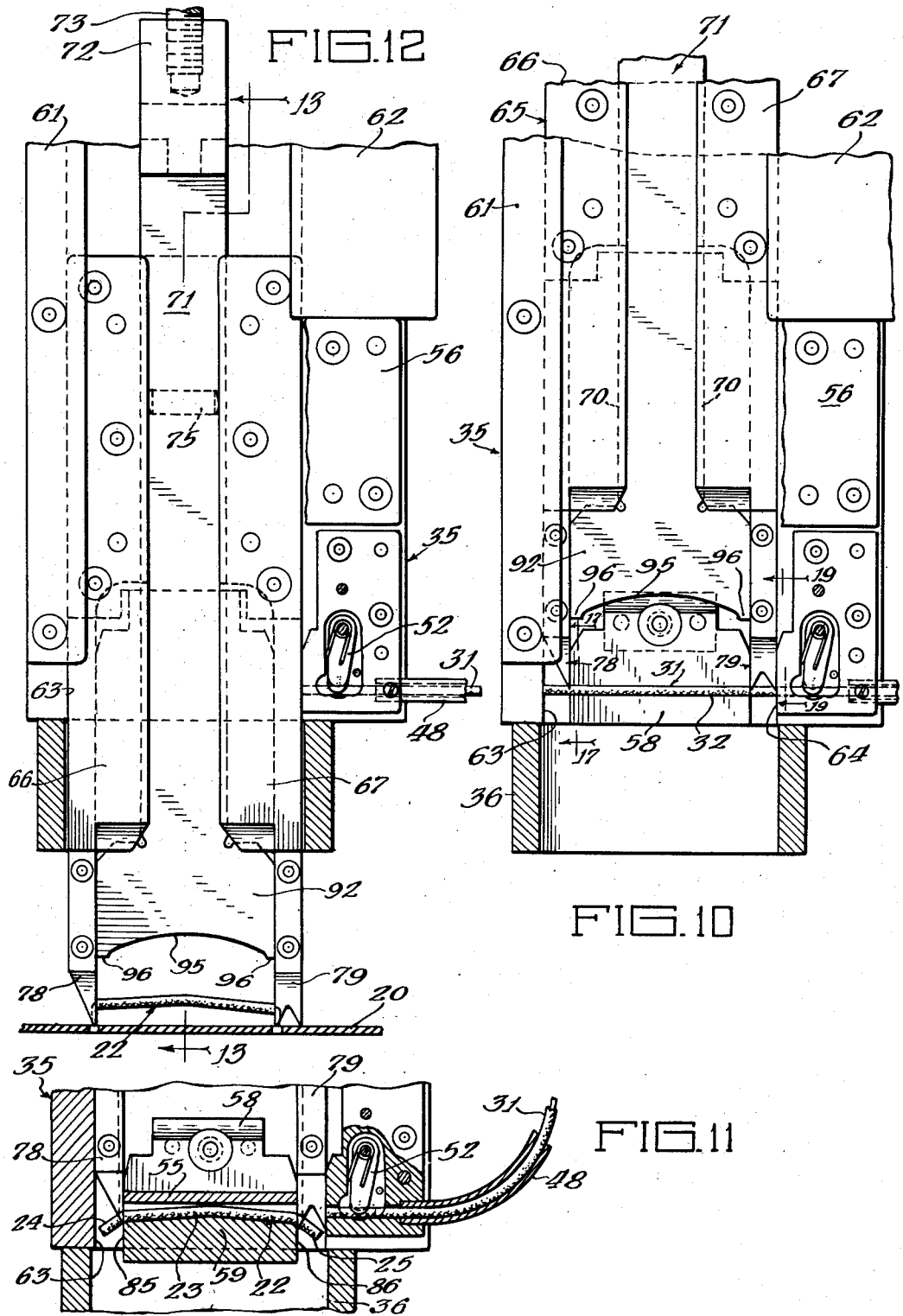

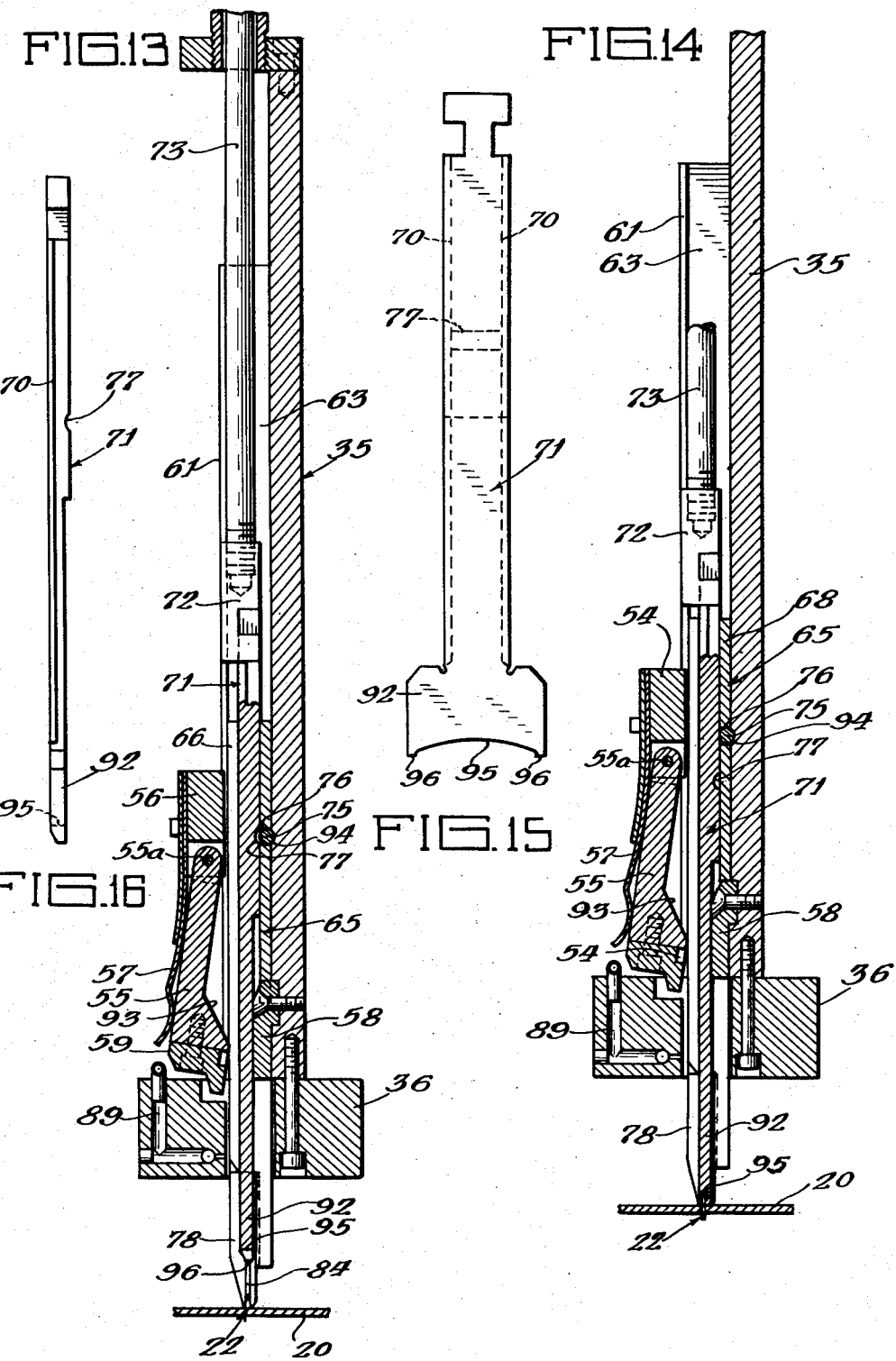

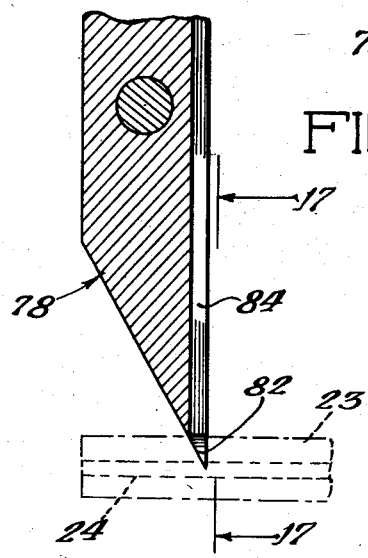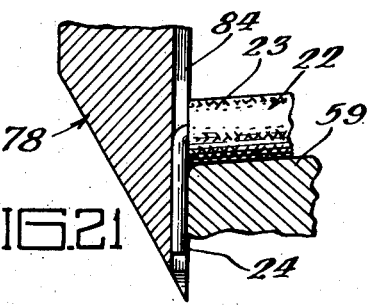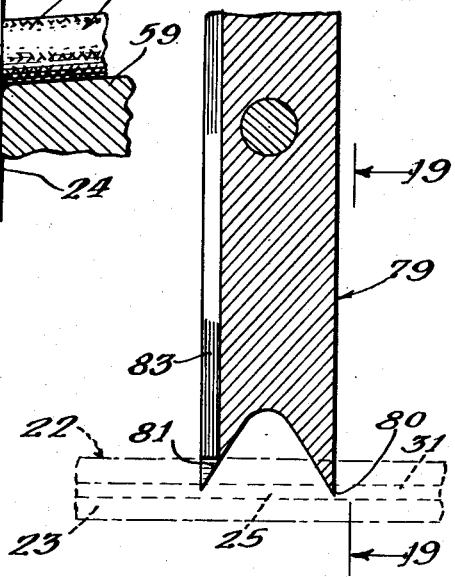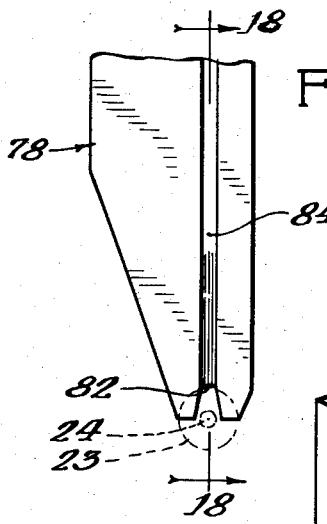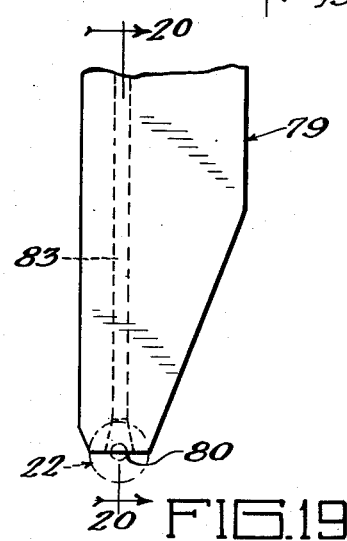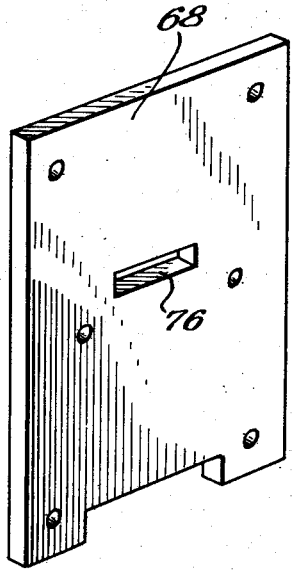

United States Patent Office 3,102,324
Patented Sept. 3, 1963

3,102,324
INSULATED WIRE HEAD
Melville R. Parke, Arlington Heights, and George A. Gagnon, Wilmette, Ill., assignors to Warwick Manufacturing Corporation, a corporation of Delaware
Filed Apr. 17, 1961, Ser. No. 103,480
3 Claims. (Cl. 29—33)

This invention relates to the fabrication and installation of wire parts, and more particularly to a head for forming and installating insulated wire parts, such as, for example, insulated jumper wires on an electrical circuit mounting board.

The primary object of this invention is to provide a new and improved device for fabricating and installing insulated wire parts.

A more specific object of this invention is to provide a new and improved device for cutting segments of insulated wire, stripping the insulation from the ends of the wire, shaping the segment, and installing the shaped segment in a mounting board. A related object is to provide for removing the stripped insulation from the head.

Other objects and advantages will become readily apparent from the following detailed description of a preferred embodiment taken in connection with the accompanying drawings, in which:

FIGURE 1 is a fragmentary, front elevational view of a head for forming and installing insulated wire parts, in accordance with the invention, with the head in a retracted position, and parts broken away to more clearly illustrate the construction;

FIGURE 2 is a side elevational view of the head illustrated in FIGURE 1;

FIGURE 3 is an enlarged sectional view taken generally along the line 3—3 of FIGURE 1;

FIGURE 4 is a sectional view taken generally along the line 4—4 of FIGURE 3;

FIGURE 5 is an enlarged sectional view taken generally along the line 5—5 of FIGURE 1;

FIGURE 6 is an enlarged sectional view taken generally along the line 6—6 of FIGURE 1;

FIGURE 7 is a perspective view of a wire segment formed and installed in a mounting board by the head of this invention, with parts broken away for clearer illustration;

FIGURE 8 is a sectional view taken generally along the line 8—8 of FIGURE 1;

FIGURE 9 is a front elevational view, similar to FIGURE 1, but showing the head in an extended position having installed a newly formed insulated wire part in a mounting board;

FIGURE 10 is an enlarged, fragmentary front elevational view of the head in a cutting position between the retracted and extended positions, with parts broken away and removed for clearer illustration;

FIGURE 11 is an enlarged, fragmentary, front elevational view of the head stripping insulation from ends of a previously cut segment of insulated wire, with parts broken away for clearer illustration;

FIGURE 12 is an enlarged, fragmentary, front elevational view of the head in an interchange position, with parts broken away and removed for clearer illustration;

FIGURE 13 is a sectional view taken generally along the line 13—13 of FIGURE 12;

FIGURE 14 is a sectional view taken generally along the line 14—14 of FIGURE 9, with the head in the extended position;

FIGURE 15 is a front elevational view of a ram removed from the head;

FIGURE 16 is a side elevational view of the ram of FIGURE 15;

FIGURE 17 is an enlarged, fragmentary, sectional view taken generally along the line 17—17 of FIGURE 10 or 18 and illustrating a left-hand finger about to strip the insulation from the end of a wire segment;

FIGURE 18 is a sectional view taken generally along the line 18—18 of FIGURE 17;

FIGURE 19 is an enlarged, fragmentary, sectional view taken generally along the line 19—19 of FIGURE 10 or 20, and illustrating a right-hand finger cutting a wire segment;

FIGURE 20 is a sectional view taken generally along the line 20—20 of FIGURE 19;

FIGURE 21 is an enlarged, fragmentary sectional view of the left-hand finger, similar to FIGURE 18, but illustrating an end of the wire segment fully bent; and, FIGURE 22 is an enlarged perspective view of a portion of a slide which carries the fingers, removed from the head.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

The invention is, in brief, directed to a device generally referred to as a head, for forming and installing insulated wire parts. In the illustrated embodiment these parts are jumper wires installed in a mounting board for a circuit of the type commonly used in manufacturing television receivers and the like. Numerous heads are often combined in series on a mass production line for simultaneously attaching various types of components to mounting boards passing down the line. The head has a feed mechanism for automatically inserting the end of an insulated wire into a cutting and forming portion of the head. The end of the wire is held in the head and cut to form a wire segment. Opposite ends of the insulated wire are stripped of their insulation and are bent to form a generally U-shaped segment. The U-shaped segment is released and moved to a position immediately adjacent the mounting board while being further shaped and formed into an insulated wire part, and the wire part is installed on the mounting board.

Referring to the drawings, FIGURE 7 illustrates a mounting board 20 which may have a printed electrical circuit on its underside. A bare jumper wire 21 is connected in the circuit and crosses the upper face of the board. A generally U-shaped insulated wire part 22, formed and installed on the mounting board 20 by the head of this invention, has an arched insulated body or bight portion 23 spaced from the jumper wire 21 and bare opposed legs 24 and 25 extending through holes in the mounting board 20 for connection with portions of the printed circuit or other jumper wires. Bight 23 of the wire part is preferably spaced from the wire jumper 21 to avoid contact between the insulation on the bight and jumper wire to retard damaging the insulation should the jumper wire 21 become hot.

FIGURES 1, 2, and 8 best illustrate the head with parts in a retracted position from which the parts move to an extended position shown in FIGURES 9 and 14, for forming and installing the insulated wire part 22 into the holes in the previously positioned mounting board 20. In returning from the extended to the retracted position, a feed mechanism 30 is actuated for feeding the end of an insulated wire 31 into a cutting and forming portion of the head. The head then moves from its retracted position through a cutting position shown in FIGURE 10 for cutting the end of the wire 31 to form a segment of insulated wire 32. As the head continues to move toward the extended position it strips the insulation from the ends of segment 32 and forms the segment generally U-shaped with the segment bight 23 slightly arched, as shown in FIGURE 11. FIGURES 12 and 13 show the head in an interchange position and partially in the extended position adjacent the mounting board 20. From the interchange position the head moves to the extended position as shown in FIGURES 9 and 13. In moving from the interchange to the extended position segment bight 23 is further arched and the insulated wire part 22 is installed in the mounting board 20.

With general reference to FIGURES 1, 2 and 8, the head has a frame 35 including a rigid body across the back of the head. A base 36 is rigidly secured to the lower end of the frame body for securely mounting the head in a jig (not shown) so that a mounting board 20 may be positioned below the head for receiving wire part 22.

The feed mechanism 30 will be described with reference to FIGURES 1–4 and 9. The front face of frame 35 has a pair of upright channels 37 and 38 each receiving a rack gear 39 and 40, respectively. An idler pinion gear 41 is journaled on a pin 42 and is received in a cut-out between the channels 37 and 38. Pinion gear teeth mesh with opposed teeth on racks 39 and 40 so that the racks move in opposite direction in the channels 37 and 38. Inner rack 39 has an inwardly directed boss 43 provided with an upright adjusting screw 44 for varying the length of wire fed. Insulated wire 31 to be fabricated into U-shaped wire parts 22, passes from a source of supply (not shown) through a bracket assembly 45 rigidly secured to the frame as by bolts, then through a slot 46 in outer rack 40 and into a guiding tube 48 from which it passes through a wire receiving passage 49 in the frame and into the cutting and forming portion of the head. As may best be seen in FIGURE 4, a feeding pawl or dog 50 is pivotally mounted in a bracket 51 secured to outer rack 40. As the head moves from the retracted to the extended position a spiral tension spring 53 secured at opposite ends to feed pawl bracket 51 and bracket 45 returns the rack 40 to its elevated position. As the head moves from the extended to the retracted position adjusting screw 44 is engaged by another part of the head, to be described hereinafter, moving inner rack 39 upwardly and outer rack 40 downwardly.

As rack 40 moves upwardly feeding dog 50 slides over insulated wire 31 which is prevented from moving with the feeding dog 50 by a holding pawl or dog 52. Holding dog 52 is pivotally mounted on a lower portion of frame 35 and extends into a portion of passage 49 as may best be seen in FIGURES 1 and 6. As the head moves from the extended to the retracted position feeding pawl 50 locks against insulated wire 31 causing the wire to move downwardly past the holding pawl 52 and into the cutting and forming portion of the head.

A slot 54 opens through the rear face of a member in the form of a jaw 55 and receives insulated wire 31 fed through passage 49 into the cutting and forming portion of the head, illustrated generally in FIGURE 11. The slot has ends opening through sides of the jaw. Slot 54 is provided by a cut-out portion having a peaked bottom surface in a removable part 59 of the jaw. Part 59 is detachably secured to the remainder of the jaw as by bolts. Jaw 55 is pivotally mounted at 55a on a bracket 56 rigid with the frame 35 for swinging movement toward and away from the front face of the frame. A strong leaf spring 57 has one end rigidly secured to a bracket 56 and an opposite end slidably engaging the outer face of jaw 55 for resiliently urging the jaw against the frame, and more particularly an abutment 58 detachably secured on the frame body. Abutment 58 detachably engages jaw 55 and overlies slot 54 to hold the end of wire 31 in the slot for subsequent operation.

Frame 35 also has a wide channel 60 opening through the front face of the frame body. As may best be seen in FIGURES 3 and 5, plates 61 and 62 are secured to the frame body and extend inwardly past the sides of the channel 60 to define guideways 63 and 64, respectively.

Referring to FIGURES 1 and 3, a slide 65 is slidably mounted in guideways 63 and 64. This slide has a pair of side arms 66 and 67 rigidly joined across the top of their rear faces by a slide plate 68, shown separately in FIGURE 22. Slide 65 is movable in guideways 63 and 64 between the extended and retracted positions of the head. In moving toward the retracted position the top of slide arm 67 engages the feeding mechanism adjusting screw 44 to actuate the feeding mechanism, as previously described. Slide arms 66 and 67 have adjacent inner faces provided with upwardly extending slots slidably receiving oppositely extending tongues 70 on a ram 71 which is slidable longitudinally within slide 65, as may best be seen in FIGURE 3.

Referring to FIGURES 1, 2 and 8, the upper end of ram 71 is detachably interlocked with a clevis 72. Clevis 72 has a socket threadedly receiving an actuating rod 73 extending freely upwardly through the frame 35. Actuating rod 73 is suitably connected with a reciprocal actuating mechanism (not shown) for reciprocating the ram 71 in the frame 35.

When the head is in the retracted position the ram 71 and slide 65 are interlocked for movement together in guideways 63 and 64 of the frame 35. With particular reference to FIGURES 3 and 8, a roller 75 is received in a rectangular opening 76 through the slide back plate 68 and an elongated arcuate groove 77 in the rear face of ram 71. Slide 65 and ram 71 are therefore securely interlocked for movement together responsive to reciprocal movement of the actuating rod 73 connected to the top of ram 71. Between the retracted position as shown in FIGURES 1, 2 and 8, and the interchange position shown in FIGURES 12 and 14, the ram and slide remain interlocked.

Detachably and rigidly secured to the lower ends of slide arms 66 and 67, as by bolts, are outwardly extending portions, and more particularly a left-hand finger 78 and a right-hand finger 79. As actuating rod 73 moves the ram 71 and interlock slide 65 from the retracted position toward the extended position, the outer faces of fingers 78 and 79 slide along and closely engage the sides of guideways 63 and 64. As illustrated in FIGURES 11, 19 and 20, a cutting edge 80 on the end of the outer face of right-hand finger 79 engages and cuts insulated wire 31 along the side wall of guideway 64. It should be noted that insulated wire passage 49 in frame 35 opens through the side wall of guideway 64.

With particular reference to FIGURE 20, it will be seen that the lower or outer end of right-hand finger 79 has an inverted generally V-shaped notch with the outer leg of the notch terminating in a cutting edge 80 which is straight and generally transverse to the path of movement of the finger. The inner leg of the V-shaped notch terminates in a stripping and bending edge 81 on the inner face of right-hand finger 79. As cutting edge 80 penetrates the insulation and before cutting the metal, stripping and bending edge 81 also penetrates the insulation. The cutting edge penetrates the metal wire which is fractured and stripped of its end insulation by the stripping and bending edge 81. The left-hand finger 78 is illustrated in detail in FIGURES 17 and 18 and has a similar but reversed stripping and bending edge 82. As viewed from the side, as in FIGURE 17, both stripping and bending edges 81 and 82 are generally U-shaped with a bight portion transverse to the direction of movement of fingers and with outwardly diverging legs. Edges 81 and 82 communicate with generally upright slots 83 and 84 in inner faces of fingers 78 and 79, respectively. These slots are just wide enough to freely receive the metal of insulated wire 31.

After the end of wire 31 has been cut, as illustrated in FIGURE 11, the resultant insulated wire segment 32 continues to be held in jaw slot 54 and the stripping and bending edges 81 and 82 of the fingers slide past and closely along adjacent opposite sides 85 and 86 of the jaw 55 and past the slot ends to strip the insulation from the ends 24 and 25 of the segment 22. Close sliding engagement of the finger outer faces and the opposed guideway faces retard outwardly directed sidewise deformation of the fingers away from the jaw sides. Continued movement of the fingers toward the extended position bends these ends, which are received in finger slots 83 and 84, as illustrated in FIGURES 11 and 21, to form a generally U-shaped segment having a slightly arched bight portion 23 formed by urging the segment against the peaked lower surface of jaw slot 54. Insulation removed from the ends 24 and 25 of the segment 22 may be held on fingers 78 and 79 and is removed therefrom, and from the vicinity of the jaw, by compressed air supplied through passages 89 in the base and discharged through opening 90 in the frame base 36.

Continued movement of the ram 71 and interlocked slide 65 toward the extended position results in a lower beveled face 91 on a lower end 92 of ram 71 engaging an upwardly facing beveled surface 93 on the inner face of jaw 55 to swing the jaw outwardly against the urging of leaf spring 57 and away from frame abutment 58, thereby freeing the segment 22 from jaw slot 54. Wire segment 22 is retained in the slide 65 by ends 24 and 25 of the segment held in finger slots 83 and 84.

As the ram and interlocked slide 65 continue to move toward the extended position the outer ends of slide fingers 78 and 79 are positioned adjacent the mounting board 20, as shown in FIGURES 12 and 13, and the head is in the interchange position. The bottom edge of slide back plate 68 abuts the top surface of frame abutment 58 to stop downwardly travel of the slide 65. In this position roller 75 is adjacent an elongated arcuate groove 94 in the base of frame channel 60 and is urged through rectangular opening 76 in slide back plate 68 and into the groove 94. Thus the slide 65 and its fingers 78 and 79 are fixed with respect to the frame and the ram is free to continue moving toward the extended position responsive to continued downward movement of actuating rod 73.

From the interchange position shown in FIGURES 12 and 13 the ram 71 continues to move toward the extended position shown in FIGURES 9 and 14. A bottom edge surface of the ram lower end 92 is concave to assure an outwardly arched bight portion 23 of wire segment 22. Ram 71 is shown independently in FIGURES 15 and 16 and it will be seen that the bottom of ram end 92 has a concave surface 95 arched upwardly and terminating at either end in downwardly extending abutments 96. These abutments engage the top outer ends of segment bight 23 adjacent the segment legs 24 and 25 and urge leg 24 through finger slot 84 and leg 25 through finger slot 83 and into the openings in a previously oriented mounting board 20. As the opposite ends of segment bight 23 are pressed against the mounting board the midportion of the bight is free to arch upwardly against the concave surface 95 of the ram end 92.

Actuating rod 73 now reverses its direction and moves ram 71 upwardly toward the interchange position. Upward movement of the ram 71 is stopped when the top edge surface of ram end 92 abuts the bottoms of slide arms 66 and 67. At this point roller 75 again moves into ram groove 77 whereupon the slide 65 is interlocked with the ram and moves therewith upwardly to the retracted position.

In moving from the interchange position toward the retracted position the upper surface of slide arm 67 engages the feed mechanism adjusting screw 44 and actuates the feed mechanism to feed another length of insulated wire 31 into jaw slot 54 and the cycle is repeated.

Round insulated wire 31 is illustrated in the drawings but the head is equally applicable to forming wire parts from flat insulated wire.

To summarize the operation of the head, as the actuating rod 73 moves the slide 65 and ram 71 to the upper or retracted position, slide 65 moves adjusting screw 44 of feed mechanism 30 to urge feeding pawl 50 downwardly thereby feeding the end of insulated wire 31 into jaw slot 54. At the end of the upward stroke actuating rod 73 reverses its direction and ram 71 and interlock slide 75 move downwardly toward the cutting position illustrated in FIGURE 11 whereupon cutting edge 80 of right-hand finger 79 cuts the insulated wire 31 to provide an insulated wire segment. The insulated wire segment is held in jaw slot 54 and against frame insert 58. Jaw 55 is held against abutment 58 by leaf spring 57. Continued downward movement of the ram 71 and slide 65 toward the extended position results in the stripping and bending edges 81 and 82 of the fingers stripping the insulation from ends 24 and 25 of the segment 22 and bending these ends to form a generally U-shaped segment with the segment ends received in grooves 83 and 84 of the fingers. During continued downward movement of the ram 71 and interlock slide 65, roller 75 releases the ram and interlocks the slide 65 with the frame 35 in the interchange position as best seen in FIGURE 13. In this position slide fingers 78 and 79 are immediately adjacent mounting board 20 and continued downward movement of the ram results in the ram end 92 engaging the segment bight 23 and moving the segment legs 24 and 25 through the finger slots 83 and 84 and into holes in the previously oriented mounting board 20, thus completing the forming and installation of the wire part 22.

We claim:
1. A head for forming and installing an insulated wire segment on a base, comprising: a frame having opposed guideways; a member between said guideways for holding a segment of insulated wire with opposite ends of the wire extending outwardly from the member and toward adjacent guideways; a slide mounted in said guideways and having a pair of outwardly extending portions slidable one along each of said guideways and past said member; stripping and bending edges on said slide portions adjacent said member for stripping the insulation from the ends of said segment and for bending the segment ends as said slide portions move past said member thereby forming a shaped wire segment; means for removing the stripped insulation from said slide portions and the vicinity of said member; and means for releasing the shaped segment from said member and installing the shaped segment on the base.

2. A head for forming and installing an insulated wire part on a mounting board adjacent said head, comprising: a frame having opposed guideways; a jaw between said guideways, said jaw having a slot extending between said guideways and cooperating with said frame for holding insulated wire with portions of the wire extending outwardly from the jaw and toward adjacent guideways; a slide mounted in said guideways and having a pair of fingers slidable one in each of said guideways and past said jaw slot, said fingers having opposed inner faces adjacent said jaw, each inner face having a slot extending inwardly from an outer free end of the finger; a cutting edge spaced from said jaw on one of said fingers for cutting said insulated wire as said cutting edge moves past said jaw slot in one direction to form a wire segment having opposite ends extending outwardly from the jaw; each of said fingers having notches at the end of their inner face defining stripping and bending edges on said fingers adjacent said jaw for stripping the insulation from the ends of the segment and for bending the segment ends as said fingers move past said jaw slot in said one direction with said stripped wire ends received in adjacent finger slots thereby forming a generally U-shaped wire part; a ram slidably mounted on said slide and movable along said finger slots; and means on said ram for releasing said wire part from said jaw slot and moving said wire part through said finger slots to install said wire part on said mounting board as said ram moves along said finger slots in said one direction.

3. A head for forming and installing an insulated wire part on a mounting board adjacent said head, comprising: a frame having opposed guideways; a jaw between said guideways, said jaw having a slot extending between said guideways and cooperating with said frame for holding insulated wire with portions of the wire extending outwardly from the jaw and toward adjacent guideways; a slide mounted in said guideways and having a pair of fingers slidable one in each of said guideways and past said jaw slot, said fingers having opposed inner faces adjacent said jaw, each inner face having a slot extending inwardly from an outer free end of the finger; a cutting edge spaced from said jaw on one of said fingers for cutting said insulated wire as said cutting edge moves past said jaw slot in one direction to form a wire segment having opposite ends extending outwardly from the jaw; stripping and bending edges on said fingers adjacent said inner faces and adjacent said jaw for stripping the insulation from the ends of the segment and for bending the segment ends as said fingers move past said jaw slot in said one direction with said stripped wire ends received in adjacent finger slots thereby forming a generally U-shaped wire part; a ram slidably mounted on said slide and movable along said finger slots; means on said ram for releasing said wire part from said jaw slot and moving said wire part through said finger slots to install said wire part on said mounting board as said ram moves along said finger slots in said one direction; and means for removing the stripped insulation from said fingers and the vicinity of said jaw.

References Cited in the file of this patent
UNITED STATES PATENTS

| | | |
|---|---|---|
| 694,031 | Schmidt | Feb. 25, 1902 |
| 2,893,008 | Gagnon | July 7, 1959 |
| 2,954,599 | Cootes | Oct. 4, 1960 |

FOREIGN PATENTS

| | | |
|---|---|---|
| 847,939 | Great Britain | Sept. 14, 1960 |